Figure 1:
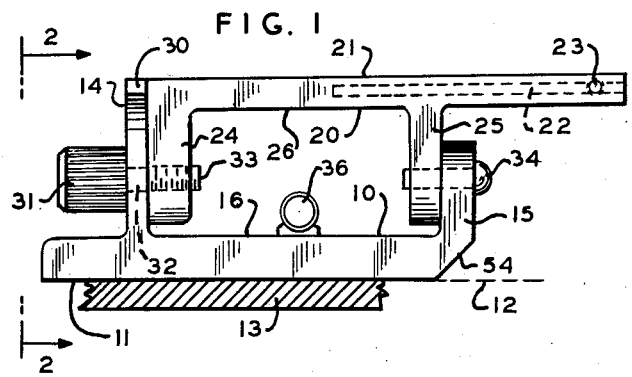

Jan. 1, 1963  H. G. OLSEN  3,070,887
MEASURING DEVICE
Filed July 5, 1960  2 Sheets-Sheet 1

INVENTOR.
HAROLD G. OLSEN
BY
ATTORNEY

Jan. 1, 1963   H. G. OLSEN   3,070,887
MEASURING DEVICE
Filed July 5, 1960   2 Sheets-Sheet 2
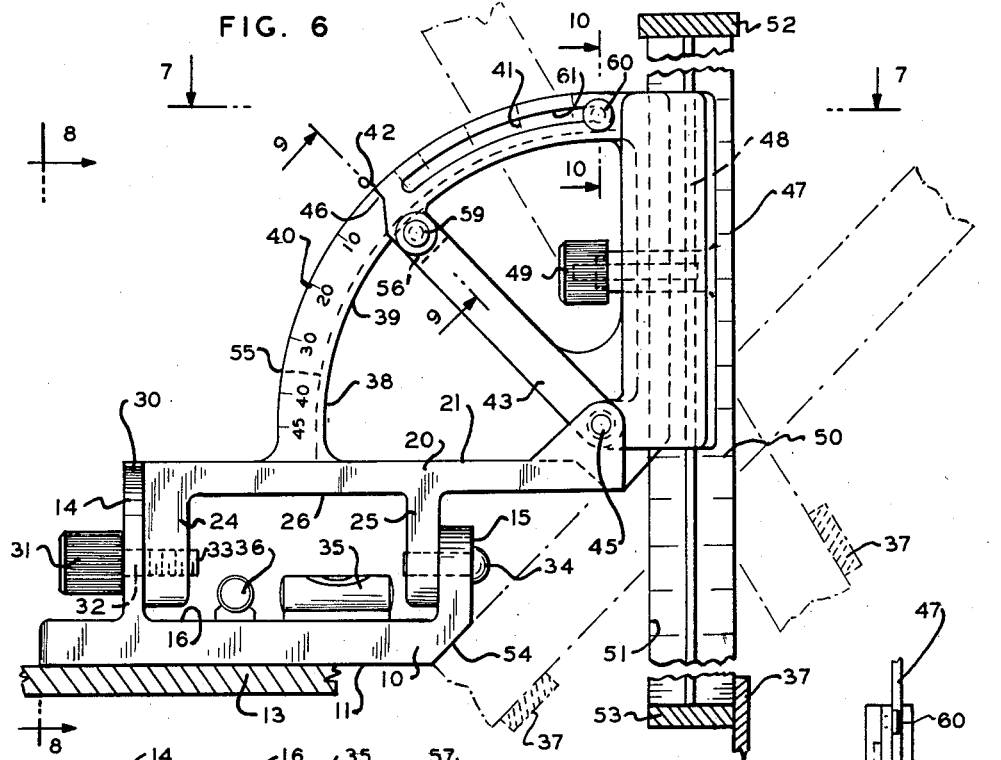
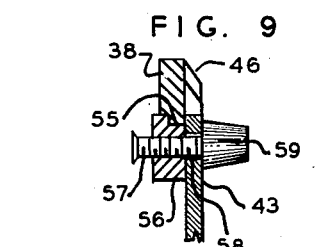
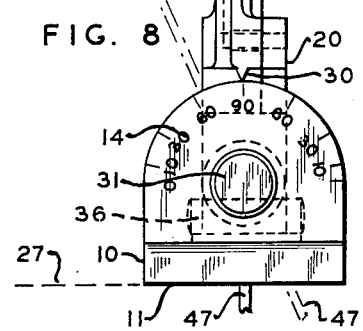
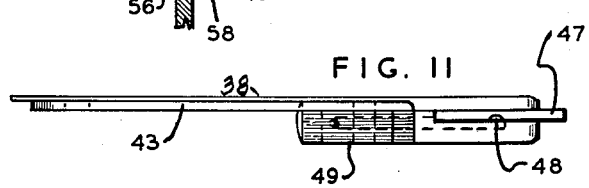
INVENTOR.
HAROLD G. OLSEN
BY
ATTORNEY _United States Patent Office_

3,070,887
Patented Jan. 1, 1963

3,070,887
MEASURING DEVICE
Harold G. Olsen, % Neptune Pattern Works, 418 George Road, Cliffside Park, N.J.
Filed July 5, 1960, Ser. No. 40,820
3 Claims. (Cl. 33—75)

This invention relates to a measuring device adapted to be readily adjusted for use in measuring and relatively calculating the planar relationship of several surfaces angularly arranged relatively to each other; the device includes novel features of automatic adjustment to said surfaces. The device is adapted for use in machine shops and other applications wherein relative angular measurements are to be made.

The drawings, illustrating procedures and devices useful in carrying out the invention, and the description below, are exemplary only of the invention, which shall be deemed to cover all other deivces and procedures coming within the scope and purview of the appended claims.

Figure 2:
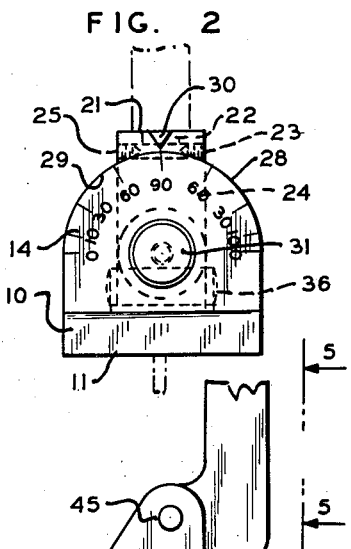
Figure 3:
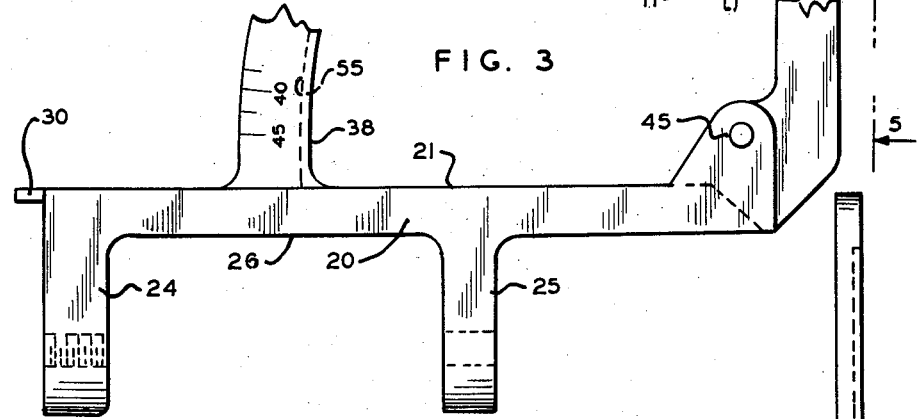
Figure 4:
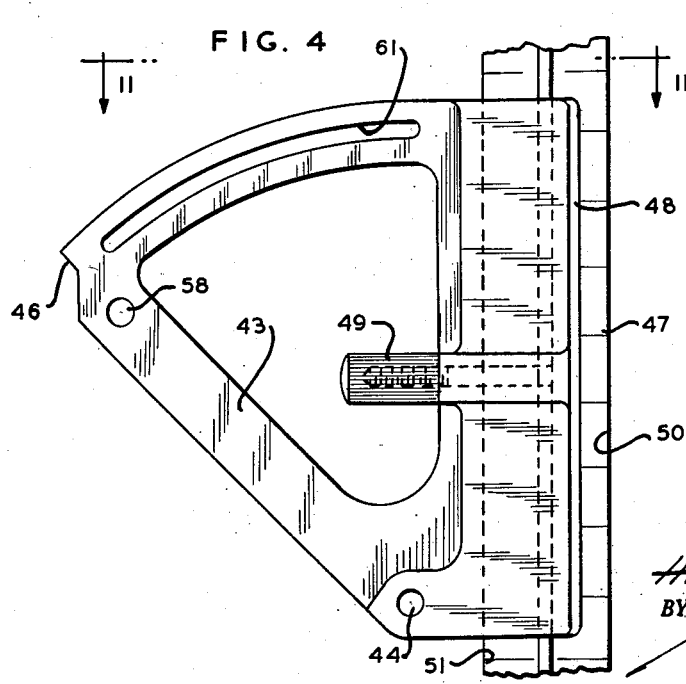
Figure 5:
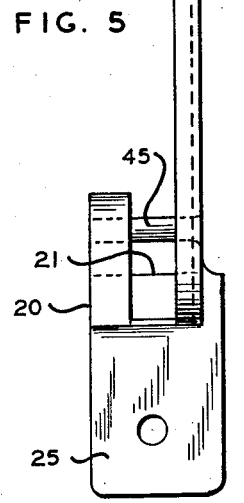

In the drawings, wherein similar reference characters indicate like parts:

FIG. 1 is a side elevational view of a measuring device embodying the invention, FIG. 2 is an end elevational view thereof, taken at line 2—2 of FIG. 1, FIG. 3 is a side elevational, partly fragmentary, view of the second plate of the measuring device of FIG. 1 having a protractor scale member secured thereto, FIG. 4 is a fragmentary elevational view of a second arcuate plate adapted to be pivotally connected at one end of the second flat plate, FIG. 5 is a side elevational view taken at line 5—5 of FIG. 3, FIG. 6 is an assembly, partly fragmentary, elevational view of a device embodying the invention, FIG. 7 is a top plan view thereof, taken at line 7—7 of FIG. 6, FIG. 8 is an end elevational view thereof, taken at line 8—8 of FIG. 6, FIG. 9 is a fragmentary sectional view taken at line 9—9 of FIG. 6, FIG. 10 is a similar view taken at line 10—10 of FIG. 6 and FIG. 11 is a top plan view of members 38, 43, 47 and 49, taken at line 11—11 of FIG. 4.

In the drawings, a device of this invention is exemplified as comprising (FIG. 1) a first plate 10 having a flat face 11 defining an axial plane 12 to be positioned on a supporting surface 13 as a reference plane for measurements to be taken. The plate is provided with parallel spaced front and rear walls 14, 15 upstanding from the opposite face 16 of plate 10 at substantially right angles to the axial plane 12 thereof. A second plate 20 (FIG. 3) is provided having a flat face 21 and adapted to support a measuring instrument in spaced parallel relation to the flat face 11 of the first plate 10. The measuring instrument may be secured to a second plate 20 by any suitable means, as by providing a slot 22 (FIG. 1) in the second plate 20 and a transverse opening 23 thereto, or, (FIG. 3), a measuring instrument may be partially or wholly formed on the second plate as below more particularly described. Second plate 20 (FIG. 3) is provided with front and rear walls 24, 25 upstanding in parallel spaced relation from the opposite face 26 of the second plate, for complementary transverse sliding movement relative to the walls 14, 15 of the first plate, by means provided for connecting said plates at pivot points parallel to and equidistant the axial plane 12 (FIG. 1) of the flat face 11 of the first plate. Thus the second plate may be readily rotated to predetermined angles relative to the plane 12 of the flat face of the first plate (as, for example, to the dotted line shown in FIG. 8) to correspondingly dispose the measuring instrument in angular relation to the supporting surface 13 (FIG. 1) on which the first plate is positioned. Means are provided for reading the degree of angular disposition of the second plate 20 relative to the transverse plane 27 (FIG. 8) of flat face 11 of the first plate. To that end one (14, for example) of the pair of walls upstanding from the first plate may be formed at the top thereof 28 to define an arc (which may be 180°, FIG. 2 marked with a scale 29); the wall 24 of the second plate having pivotal sliding engagement therewith and having a reference pointer or marker 30 for registry with said arc, thereby enabling the user to rapidly read the relative angular disposition of the second plate 20 relative to the surface 13. Means are provided for holding the second plate at the desired relative angular position. Such means may, for example, (FIG. 1) comprise a bolt 31 passing freely through the pivot aperture 32 of the wall 14 and having a stud 33 threadedly engaging the wall 24 of the second plate. Walls 25, 15 may be further pivotally connected equidistant the axial plane 12 of the first plate 10 as by pivot pin 34 (FIG. 1) fixed to one of the walls 15, 25 and passing through an aperture provided in the other. Other suitable means may be provided for achieving the pivotal rotation and interengagement if desired of walls 24, 25 and 14, 15; the drawings illustrate practical forms thereof.

Means may be provided for indicating the degree of deviation of the first plate from a true horizontal position as (FIG. 6) by securing to said first plate a level 35 which may be disposed parallel to the longitudinal axis of the said plate or (36) transversely thereof.

In addition to the readings which may be attained by the form of invention thus far described, a protractor arrangement may be provided enabling the device to be used to indicate a further relative angular disposition of surface, 13, relative to another surface, such as, for example, surface 37 (FIG. 6). To that end (FIGS. 3 and 6) second plate 20 may have a first protractor scale member 38 fixed at opposite ends thereto and extending upwardly therefrom at substantially right angles to the longitudinal axial plane 12 and having as said protractor scale member 38 an arcuate portion 39 (FIG. 6) with scale markings 40, 41 thereon which may, for example, provide two 45° readings from a zero marking 42 on said arcuate portion 39. Protractor scale member 38 may constitute a reference point for a second arcuate plate 43 (FIG. 6) pivoted on pivot pin 45 (FIG. 5) passing through opening 44 in plate 43 (FIG. 4) on protractor scale member 38. Straight edge member 47 may slide in channel 48 of second plate 20 (FIGS. 6 and 8) and clamp 49 may secure member 47 at the desired vertical position in channel 48. Member 47 may have suitable measurement scales 50, 51 marked thereon. On loosening member 49, straight edge 47 may be moved up to a point of abutment with a top surface 52 (FIG. 6) or downwardly to a bottom surface 53 to attain relative scale and angle readings.

The position of pointer 46 on markings 40, 41 of the scale member 38 fixed to the second plate 20 enables one to read the angular relation of a surface such as 37 for example, against which the straight edge 47 is shown positioned in FIG. 6 relative to the first surface 13.

The first plate 10 may be formed with an angular rear edge 54 so that (dotted lines, FIG. 6) the straight edge 47 may be moved to the relative 45° angle thus marked.

The second arcuate plate 43 may have slidable engagement with the arcuate portion 39 of the scale member 38 as, for example, shown in FIG. 10, and means may be provided for holding the member 43 at a predetermined relative position to member 38. For example, a member 38 may be provided with a shouldered edge portion 55 (FIG. 9) and a slide block 56 provided for complementary slidable interengagement therewith. Said slide block is shown secured to second arcuate plate 43 by pin 57 passed through an aperture 58 in said second arcuate plate 43 (FIG. 9) and threadedly engaging the slide block 56. One end of pin 57 has a knob 59 fixed thereto rotatable in one direction to interengage the members 39, 43, tightly and in the other direction to permit said members to have relative sliding movement. The protractor scale member 38 may have a pin 60 passing through an arcuate slot 61 in the second arcuate plate 43 and said pin may have an enlarged head (FIG. 10), for further alignment of the parts if desired.

Having thus described my invention, what I claim as new and desire to secure by Letters Patent is:

1. In a measuring device, a first plate having a flat face defining an axial plane to be positioned on a supporting surface, a second plate having an elongated flat face, complementary means between the plates for relative movement of one of the plates relative to the other, including a flat wall fixed to and upstanding from the first plate and having an arcuate free end remote therefrom, calibrations on said free end, a flat wall depending from the second plate and having a marker for registry with said calibrations, said walls being pivotally interconnected, so that, by pivotal rotation of the wall of the second plate the angular position of the second plate relative to the first plate will be indicated by registration of the marker of the second wall with the calibrations of the arcuate end of the first wall, a first arcuate plate fixed at opposite ends to the second plate to extend at right angles to the longitudinal axis of said second plate, said first arcuate plate having a calibrated scale thereon, a second arcuate plate pivotally connected at one end to the second plate and having a pointer for registry with the scale of the first arcuate plate, and a straight edge member secured to the second arcuate plate so that the said straight edge member may be positioned against a surface whose angle is indicated relative to the flat face of the first plate by the position of the pointer of the second arcuate plate relative to the scale of the first arcuate plate.

2. In a measuring device as set forth in claim 1, level indicating means on said first plate.

3. In a measuring device as set forth in claim 1, means for holding the second plate against pivotal movement relative to the first plate in predetermined angular relation thereto.

References Cited in the file of this patent
UNITED STATES PATENTS

| | | |
|---|---|---|
| 1,222,959 | Longley | Apr. 17, 1917 |
| 1,338,095 | Reid et al. | Apr. 27, 1920 |
| 2,481,062 | Anderson | Sept. 6, 1949 |